United States Patent
Singh et al.

(10) Patent No.: US 8,279,779 B2
(45) Date of Patent: Oct. 2, 2012

(54) METHOD AND SYSTEM FOR VIRTUAL AGENT SESSION MONITORING AND BARGE-IN

(75) Inventors: Amit Singh, Irving, TX (US); Amar Nageswaram, Irving, TX (US); Dinyar Kavouspour, Plano, TX (US); Fari Ebrahimi, Basking Ridge, NJ (US); Tao Yang, The Colony, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 316 days.

(21) Appl. No.: 12/635,477

(22) Filed: Dec. 10, 2009

(65) Prior Publication Data

US 2011/0141919 A1 Jun. 16, 2011

(51) Int. Cl.
*H04L 12/16* (2006.01)
*H04M 3/00* (2006.01)
*G06F 3/00* (2006.01)

(52) U.S. Cl. .................... 370/260; 379/265.09; 715/758

(58) Field of Classification Search .................... None
See application file for complete search history.

(56) References Cited

U.S. PATENT DOCUMENTS

| | | | |
|---|---|---|---|
| 2001/0024497 A1* | 9/2001 | Campbell et al. ........ | 379/265.09 |
| 2005/0027827 A1* | 2/2005 | Owhadi et al. ................ | 709/219 |
| 2006/0165066 A1* | 7/2006 | Campbell et al. ............. | 370/352 |
| 2007/0025535 A1* | 2/2007 | Bushey et al. ........... | 379/201.03 |
| 2007/0168457 A1* | 7/2007 | Huerta et al. .................. | 709/217 |
| 2008/0046386 A1* | 2/2008 | Pieraccinii et al. ........... | 705/402 |
| 2008/0086696 A1* | 4/2008 | Sri Prakash et al. .......... | 715/757 |
| 2008/0215976 A1* | 9/2008 | Bierner et al. ................ | 715/708 |
| 2009/0083380 A1* | 3/2009 | Smyth et al. .................. | 709/206 |
| 2009/0086957 A1* | 4/2009 | Kelley et al. ............. | 379/265.09 |
| 2009/0307023 A1* | 12/2009 | Hamilton et al. .................. | 705/7 |

* cited by examiner

*Primary Examiner* — Clemence Han

(57) ABSTRACT

An approach is provided for virtual agent session monitoring and barge-in. A platform monitors content of a communication session between a virtual agent and a user and determines whether the content satisfies a pre-defined rule. Further, the platform selectively initiates a barge-in of the communication session by a live agent based on the determination.

20 Claims, 9 Drawing Sheets

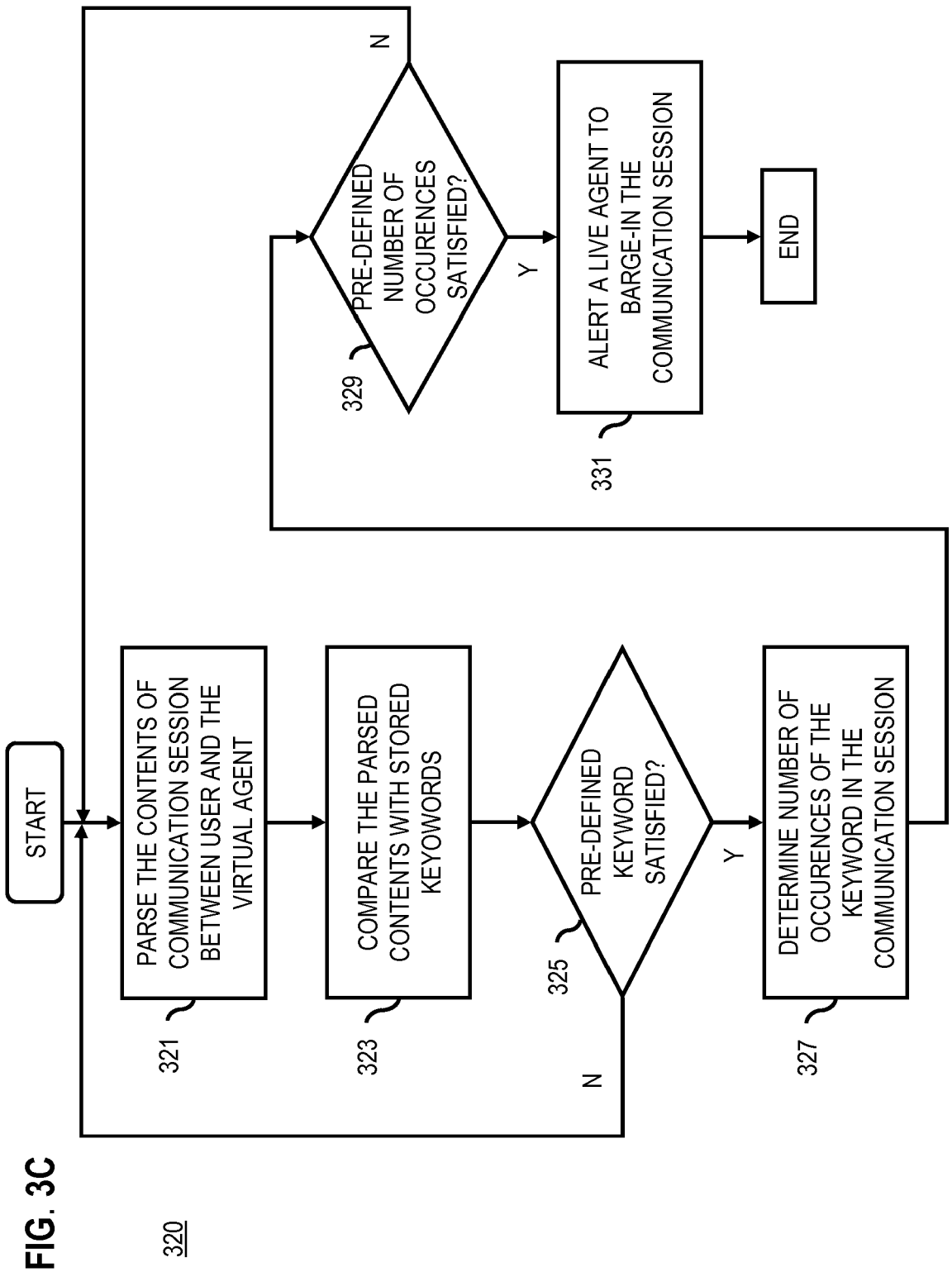

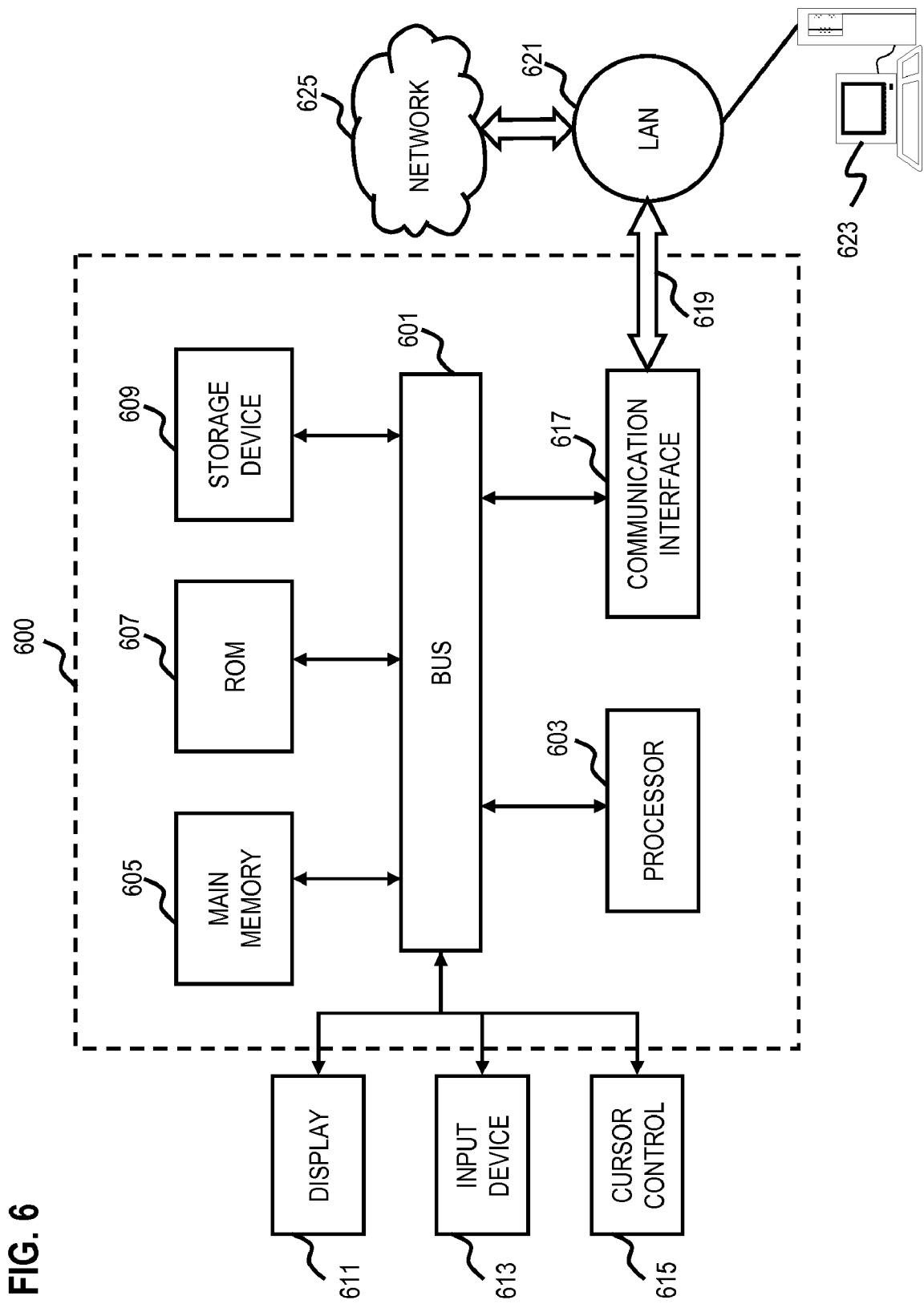

METHOD AND SYSTEM FOR VIRTUAL AGENT SESSION MONITORING AND BARGE-IN

BACKGROUND INFORMATION

Online and web based support tools are increasingly being used to provide service (e.g., technical/sales) support for customers. Although chat based customer support systems are cost effective and economical, the customer experience can be poor. Typically chat initiation starts with a click of a button or link on the website and instructions are given the customer to enter name and other relevant information. When all the service agents are busy, the customer must wait for the customer service representative to join the chat.

Additionally, current automated self-service channels, e.g., via interactive voice response (IVR) systems, websites, etc., provide great savings to service providers in terms of human resource costs. However, these channels lack the capability and sophistication to address all customers' issues, especially if such issues are specific to the customer. Thus, unacceptable customer experience can generally result.

Therefore, there is a need for an approach for integrating automated support channels with human-assisted customer support tools to provide economical and effective customer assistance.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3A-3D are flowcharts of processes for monitoring contents of communication sessions based on pre-defined rules and/or keywords, according to various exemplary embodiments;

FIG. 6 is a diagram of a computer system that can be used to implement various exemplary embodiments.

DESCRIPTION OF THE PREFERRED EMBODIMENT

A preferred apparatus, method, and system for providing virtual agent session monitoring and barge-in are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Figure 1A:
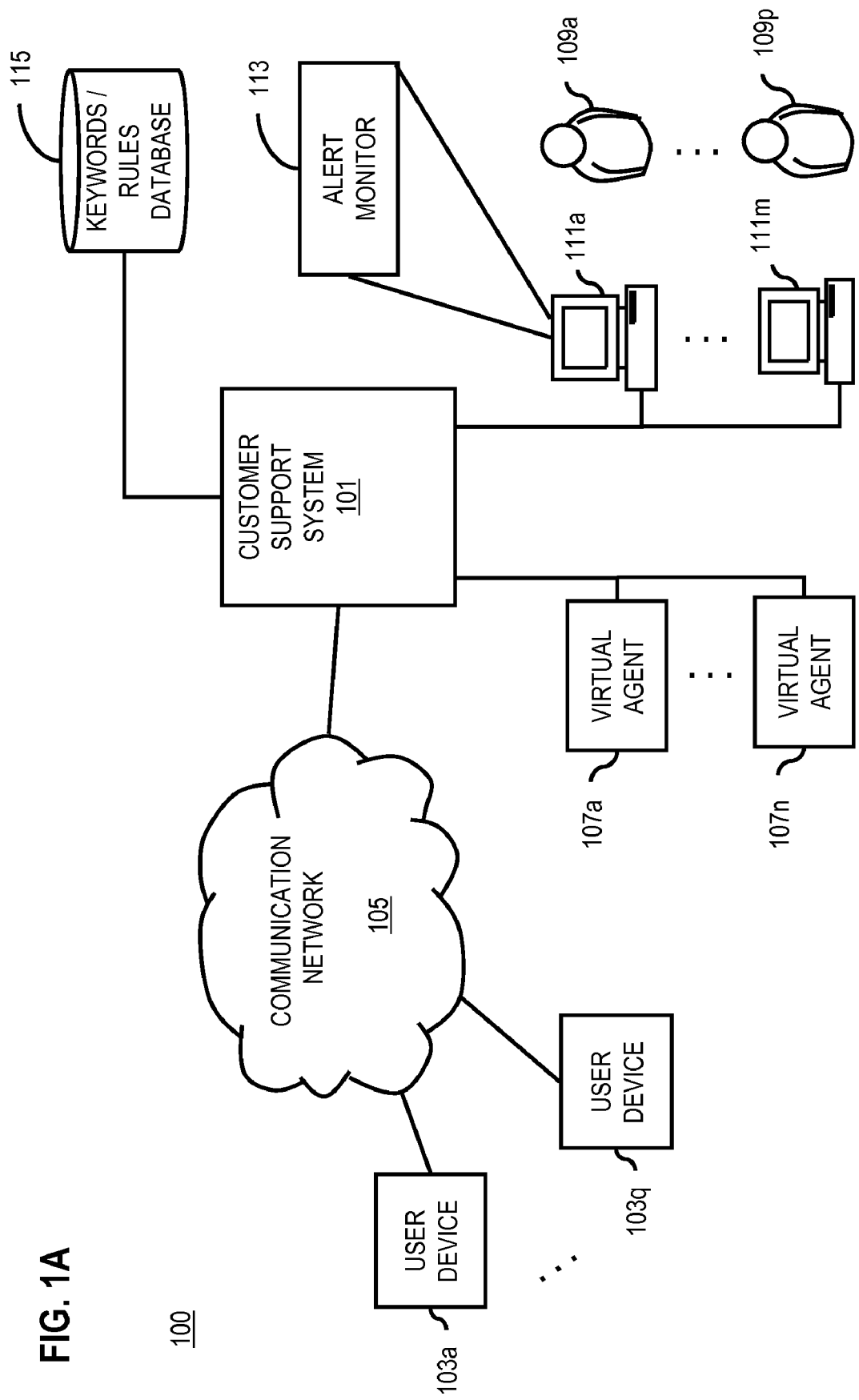
FIGS. 1A and 1B, are, respectively, a diagram of a system and associated process for providing virtual agent session monitoring and barge-in, according to various embodiments.
Figure 1B:
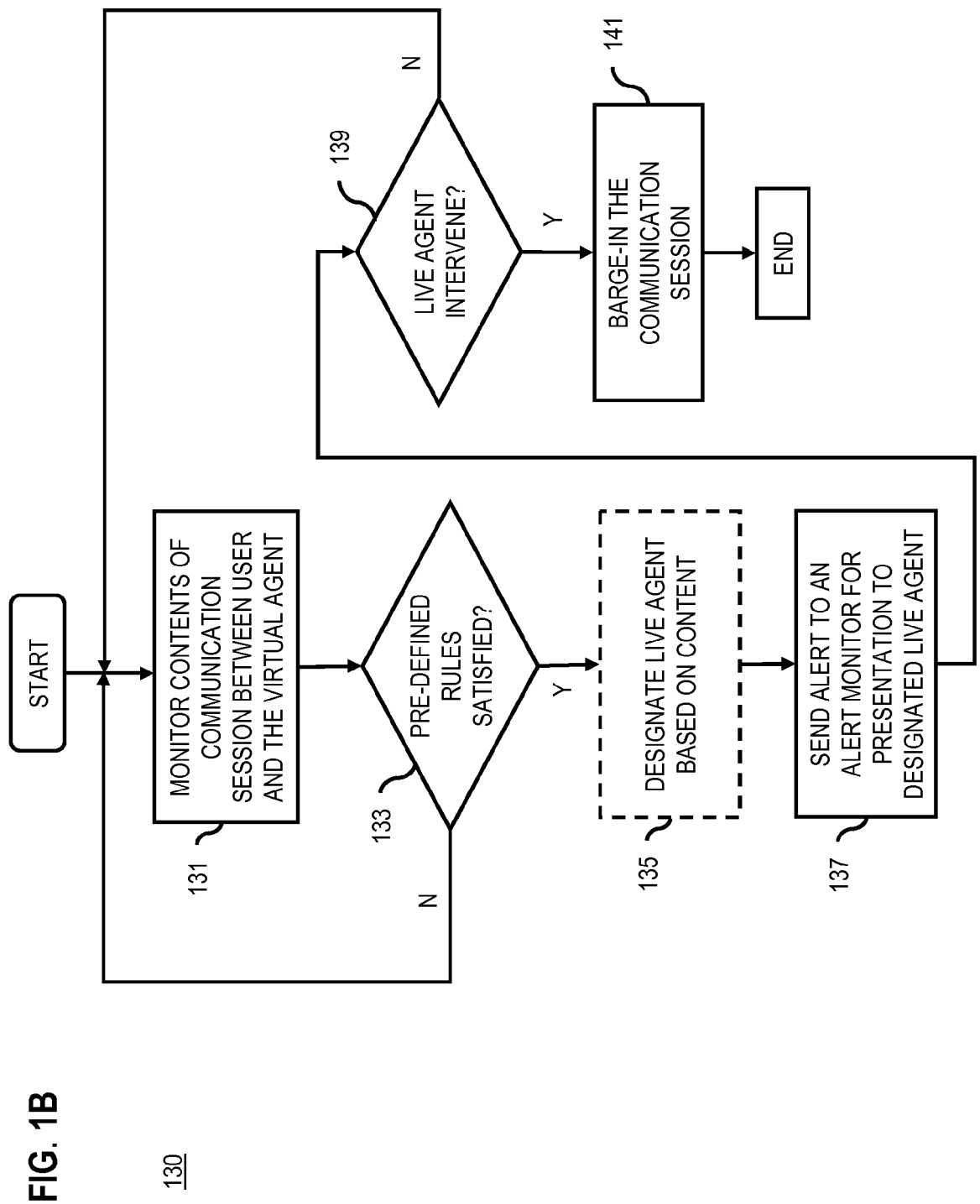

FIGS. 1A and 1B, are, respectively, a diagram of a system and associated process for providing virtual agent session monitoring and barge-in, according to various embodiments. As shown, system 100 can provide self-service customer support and can advantageously monitor level of provided self-service customer support and enable human-assisted customer support if the level of self-service support is not satisfactory. According to certain embodiments, the customer support system 101 is able to offer economical and effective customer assistant by flexibly and efficiently combining live customer services (such as human-assisted customer support) with self-service customer supports (such as services provided by virtual agents).

It is recognized that organizations (or companies) are finding it increasingly challenging to provide responsive customer service and support in a cost effective manner. Customer service and support channels can generally be categorized into two broad categories (1) customer self-service and (2) human-assisted support. These different service channels can be utilized to improve user experience by facilitating high interactivity and promoting expedient resolution of customer issues. In addition, the burden of personnel costs (such as labor costs, training costs, human error, etc.) can be minimized. Although customer self-service support channels can provide considerable cost advantage; this self-service support channel, however, can be less effective at serving customers than human-assisted channels, as the reasons explained earlier.

In the embodiment of FIG. 1A, users, customers, and/or potential customers employs user devices 103a-103q to access the customer support system 101 through the communication network 105. The customer support system 101 can include and/or be coupled to a portal, e.g., online portal or web portal, (not shown) to facilitate communication between the customer support system 101 and the user devices 103a-103q over the communication network 105. User devices 103a-103q may include any computing equipment capable of sending and/or receiving one or more forms the following communication modes, e.g., chat-based communications, electronic mail communications, facsimile communications, telephony communications, etc.

The customer support system 101 can provide different services through different modes and/or channels of communications, for instance, self-service, virtual chat, live chat, email support, mobile chat, click-to-call, etc. to provide services according to the requirements of the users. Each service communication channel can be more appropriate in different scenarios and can involve different costs for implementation. In the exemplary embodiment of FIG. 1A, the customer support system 101 includes one or more contact channels to platforms (or modules) that provide different modes of interactive communication with user devices 103a-103q. The term "platform" or "module" as used herein can encompass the processing and communication hardware and software appropriate to perform the function required. Such elements may be incorporated into a single location or distributed. Platform or module elements may in part be dedicated to a particular mode or shared to support multiple modes of operation. For illustration purposes, the customer support system 101 utilizes one or more virtual agents 107a-107n and live agents 109a-109p to provide necessary support and assistance to users.

According to an exemplary embodiment, a user (such as a customer and/or a potential customer) communicates with the customer support system 101, for example, for requesting assistance with a product, service, etc. The user interaction with the customer support system 101 can be based on a self-service customer support. In one example, the self-service customer support offered by the customer support system 101 can be provided by virtual agents 107a-107n. As used herein, the term "virtual agent" can be an individual member of a "virtual staff group." Similarly, a "virtual staff group" can refer to set of staff members associated with an organization (e.g., a business, a university, and a charity), a third party, other parties, or any combination thereof, that perform services requested. Additionally, the virtual agents may be located on-site, off-site, or a combination thereof. In an exemplary embodiment, each virtual agent 107 can be associated with rich presence information describing one or more characteristics of the virtual agent 107. For instance, these characteristics can include, but are not limited to: a skill set of the virtual agent 107, the presence status of the virtual agent 107, location of the virtual agent 107, calendar information of the virtual agent 107, communication capability of the virtual agent 107, and mobility of the virtual agent 107. As noted, communication between the user and the virtual agent 107 can be through different communication channels.

According to certain embodiments, the customer support system 101 is configured to automatically monitor the services provided to the users by the virtual agents 107a-107n (such as to monitor contents of communication sessions between the users and the virtual agents 107a-107n) and to enable human-assisted customer support if the customer support system 101 determines that the service provided by the virtual agents are not satisfactory. Hence, effectiveness of human-assisted customer tools and cost saving of self-service customer support tools can be efficiently combined. In this case, the customer support system 101 can include and/or be coupled to devices or terminals 111a-111m that can be used by live agents 109a-109p to monitor and/or barge-in the communication sessions, if needed. In certain embodiments, the barge-in function provides the addition of another party to an existing communication session without requiring termination of the existing session.

A user who needs assistance may use a user device (such as user devices 103a-103q) to communicate with the customer support system 101 through communication network 105. Assuming the user chooses self-service customer support, a portal (not shown) of the customer support system 101 can provide an interface for communication between the user and one of virtual agents 107a-107n (for example virtual agent 107a). The virtual agent 107a can collect information from data received from the user and to generate data for output at the portal (not shown) in response to the collected information. The virtual agent 107a may, by way of example, contain "expert system" software and/or hardware that attempt to reproduce the performance of one or more human experts.

In an exemplary embodiment, user devices 103a-103q can include any user device capable of sending and/or receiving one or more forms of modes of communication such as telephony communications, e-mail communications, facsimile communications, chat-based communications, etc. For instance, user devices 103a-103q may include functionality for telephony-based communications, such as those functions employed by suitable plain old telephone service (POTS) devices, facsimile machines, and the like. The user devices 103a-103q may employ mobile (or otherwise wireless) functions, such as included in cellular phones, radiophones, satellite phones, smart phones, wireless phones, or any other suitable mobile device, such as personal digital assistants (PDA), pocket personal computers, tablets, customized hardware, etc. Further, user devices 103a-103q may include computing device functions, such as implemented by any suitable computing device, e.g., VoIP phones, skinny client control protocol (SCCP) phones, session initiation protocol (SIP) phones, IP phones, personal computers, softphones, workstations, terminals, servers, and the like.

Also, the communication network 105 may include one or more networks such as a data network and/or a telephony network. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. Moreover, the telephony network can be provided via a combination of circuit-switched technologies or a packetized voice infrastructure.

For the purpose of illustration, the communication network 105 can include a radio network that supports a number of wireless terminals, which may be fixed or mobile, using various radio access technologies. According to one exemplary embodiment, radio technologies that can be contemplated include: first generation (1G) technologies (e.g., advanced mobile phone system (AMPS), cellular digital packet data (CDPD), etc.), second generation (2G) technologies (e.g., global system for mobile communications (GSM), interim standard 95 (IS-95), etc.), third generation (3G) technologies (e.g., code division multiple access 2000 (CDMA2000), general packet radio service (GPRS), universal mobile telecommunications system (UMTS), etc.), 4G, etc. For instance, various mobile communication standards have been introduced, such as first generation (1G) technologies (e.g., advanced mobile phone system (AMPS), cellular digital packet data (CDPD), etc.), second generation (2G) technologies (e.g., global system for mobile communications (GSM), interim standard 95 (IS-95), etc.), third generation (3G) technologies (e.g., code division multiple access 2000 (CDMA2000), general packet radio service (GPRS), universal mobile telecommunications system (UMTS), etc.), and beyond 3G technologies (e.g., third generation partnership project (3GPP) long term evolution (3GPP LTE), 3GPP2 universal mobile broadband (3GPP2 UMB), etc.).

Complementing the evolution in mobile communication standards adoption, other radio access technologies have also been developed by various professional bodies, such as the Institute of Electrical and Electronic Engineers (IEEE), for the support of various applications, services, and deployment scenarios. For example, the IEEE 802.11 standard, also known as wireless fidelity (WiFi), has been introduced for wireless local area networking, while the IEEE 802.16 standard, also known as worldwide interoperability for microwave access (WiMAX) has been introduced for the provision of wireless communications on point-to-point links, as well as for full mobile access over longer distances. Other examples include Bluetooth, ultra-wideband (UWB), the IEEE 802.22 standard, etc.

As mentioned, customer support system 101 can monitor the customer support provided by the virtual agents 107a-107n. In one embodiment, a communication session between a user and a virtual agent (such as virtual agent 107a) can include a voice communication session. By way of example, customer support system 101 can include voice recognition capabilities in order to monitor contents of the voice communication session. Also, the communication session between the user and the virtual agent 107a can include a chat session (such as a virtual chat session) and customer support system 101 is configured to monitor the content of the chat session. It is contemplated that communication session between users and virtual agents 107a-107q can include various communication channels and customer support system 101 can be able to monitor content of these communication sessions.

According one embodiment, customer support system 101 can intercept messages between the virtual agent and the user. Further, customer support system 101 can examine the content of the communication session (such as messages between the virtual agent 107a and the user) based on pre-determined keywords and/or rules. In one exemplary embodiment, if this examination indicates that the customer support provided by the virtual agent is under a required service level, customer support system 101 can initiate an interception and/or barge-in of the communication session by live agents (such as live agent 109a) and communication an alert message to them. In this example, the live agent 109a can join the communication session between the user and the virtual agent 107a to continue the customer support. In one exemplary embodiment, customer support system 101 can determine a live agent (such as live agent 109a) based on the content of the communication session. The selection of the live agent can be also based on level of expertise of the live agent, availability of live agents, location of live agents, communication channel of the communication session, etc.

Additionally or alternatively, the customer support system 101, based on determining the unsatisfactory level of support provided by the virtual agent 107a, can generate an alert message to be sent to a live agent device (such as live agent device 111a). In one example, the alert message can include information regarding the communication session and instructions for the live agent 109a to intercept and/or barge-in the communication session. Additionally or alternatively, the alert message can initiate the intercept and/or barge-in of the live agent 109a.

Further, one or more of the live agent devices 111a-111m (such as live agent device 111a) can include and/or be coupled to an alert monitor 113. The alert message generated by customer support system 101 can be transmitted to the alert monitor 113 to present information about the communication session to live agents 109a-109p. In one embodiment, a live agent (such as live agent 109a) can observe the alert monitor 113 to decide if intercepting and/or barging-in the communication session between the virtual agent and the user is necessary. If the live agent 109a determines that intercepting and/or barging-in is necessary, customer support system 101 can initiate the interception and/or barge-in of the communication session by the live agent 109a and the live agent 109a can participate in the communication session. However, if customer support system 101 determines that service provided by the virtual agent 107a is not satisfactory, customer support system 101 can initiate a new communication session between live agent 109a and the user and disable the communication session of the virtual agent 107a.

As discussed, customer support system 101, after monitoring content of the communication session, determines whether the content satisfy pre-defined keywords and/or rules. In one exemplary embodiment, customer support system 101 can include and/or be coupled to keywords/rules database 115 to retrieve keywords and/or rules used for the determination. In one instance, the keywords and/or rules are based on service level requirements defined for customer support system 101.

According to one embodiment, the communication session between the user and the virtual agent 107a can include a chat session. The customer support system 101 can parse in the content of the communication session and compare the characters, words, numbers, symbols, etc. of the content with keywords, which, for example, are stored in the database 115. Determining whether the contents satisfy pre-defined keywords and/or rules can include determining presence of pre-defined keywords in the content. Further, customer support system 101 can be configured to determine number of occurrences of keywords in the content of the communication session, to compare it to pre-defined thresholds, and to initiate a barge-in of the live agent 109a if the threshold is satisfied. Additionally or alternatively, determining presence of keywords in the content of the communication session can include determining presence of an emoticon (e.g., textual expressions representing a mood or facial expression of the user—such as ☺). In certain embodiments, the length or duration of the communication session can be used as an indicator that support provided by the virtual agent is not satisfactory. In this example, customer support system 101 is configured to determine duration of the communication session and compare the determined duration with pre-defined thresholds.

According to another exemplary embodiment, satisfying pre-defined keywords and/or rules can include determining whether the content of the communication session includes any questions and whether the virtual agent is able to provide answers. In this exemplary embodiment, customer support system 101 can detect a question by monitoring the content and determine, from a predetermined set of answers whether an answer can be provided. The customer support system 101 can initiate the interception and/or barge-in of the live agent 109a if it is determined that virtual agent 107a is unable to provide an answer. With respect to use of keywords, it is contemplated that the pre-defined rule can specify presence of keyword(s), the number of occurrences of the keyword(s), combinations of keywords, etc. as the criteria.

Although exemplary pre-defined rules are expressed, it is contemplated any pre-defined rule (such as any combination of the above-noted rules) can be used to determine the level of service provided by the virtual agents 107a-107n. It is noted that, according to certain embodiments, customer support system 101 can be maintained by a service provider and the communication sessions can be associated to services provided by the service provider.

The customer support system 101 can advantageously combine cost savings of virtual agents with effectiveness of live agents by monitoring contents of communication sessions of the virtual agent and initiating interception and/or barge-in of live agents. An exemplary process, which can be performed by customer support system 101 is further discussed with respect to FIG. 1B.

As seen in FIG. 1B, the process 130 can be performed when a user is being serviced by a virtual agent (such as virtual agent 107a of FIG. 1A). At step 131, the content of the communication session between the user and the virtual agent is monitored. As discussed, the communication session can be based on different communication channels such as instant messaging, chat, voice, email, etc.

At step 133, the monitored content of the communication session is analyzed according to a pre-defined rule (and/or keywords), and a determination is made whether the pre-defined rule is satisfied. The process 130 continues to monitor content of the communication session between the user and the virtual agent if the pre-defined rule is not satisfied. As mentioned, pre-defined keyword and/or rules can include presence of a keyword, number of occurrences of a keyword, duration of the communication session, presence of an emoticon, detection of a question and inability of the virtual agent to provide an answer, response time of the virtual agent, number of searches and queries performed by the virtual agent, etc.

In one exemplary embodiment, the pre-defined rules and/or keywords are defined based on service level requirements. Therefore, if the pre-defined rules and/or keywords are satisfied, it is a determination that level of service provided by the virtual agent is lower than expected service level. At optional step 135, a live agent, such as live agent 109a, can be designated based on, for example, the content of the communication session. Other criteria, such as expertise of the live agent 109a, location of the live agent 109a, communication channel of the communication session, etc., can be used to select live agent 109a.

At step 137, an alert message is generated and sent to an alert monitor (such as alert monitor 113) to present information associated with the communication session to the live agent 109a. In one example, the alert monitor 113 can include a real time dashboard that presents the alert messages. Additionally or alternatively, the alert message can be sent to a live agent device (such as live agent device 111a) for presenting the information and initiating interception and/or barge-in of the live agent 109a.

At optional step 139, a determination is made whether the live agent should intervene. At step 141 interception and/or barge-in of the communication session by the live agent 109a is initiated. In one exemplary embodiment, the live agent 109a joins the communication session of the virtual agent 107a and the user and continues the support. Additionally or alternatively, a new communication session is initiated between the user and the live agent 109a. The new communication session can be through the same communication channel used by the virtual agent 107a and the user and/or can be through a different communication channel.

Figure 2:
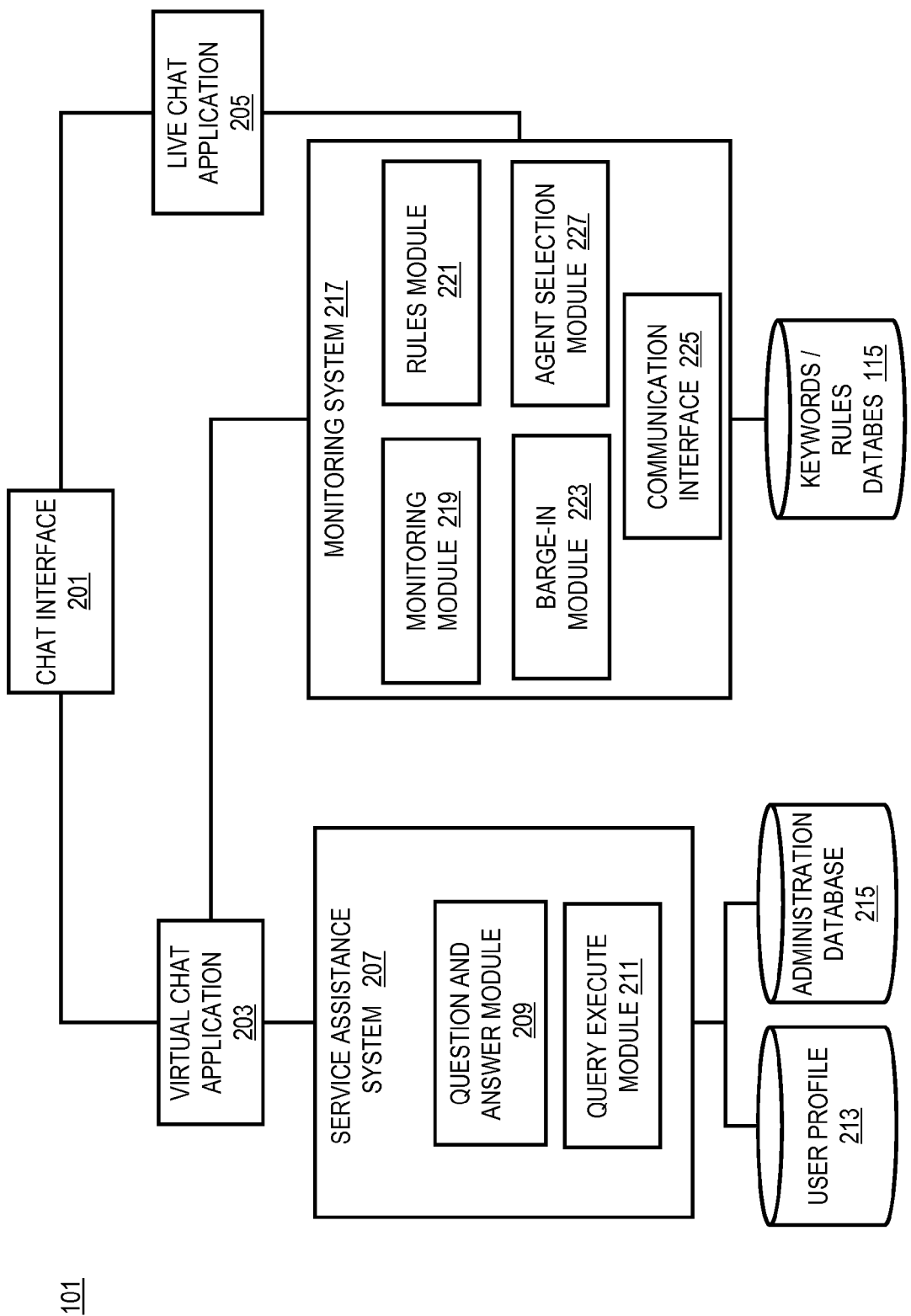
FIG. 2 is a diagram of components of a customer support system utilized in system 1A, according to an exemplary embodiment.
Figure 3A:
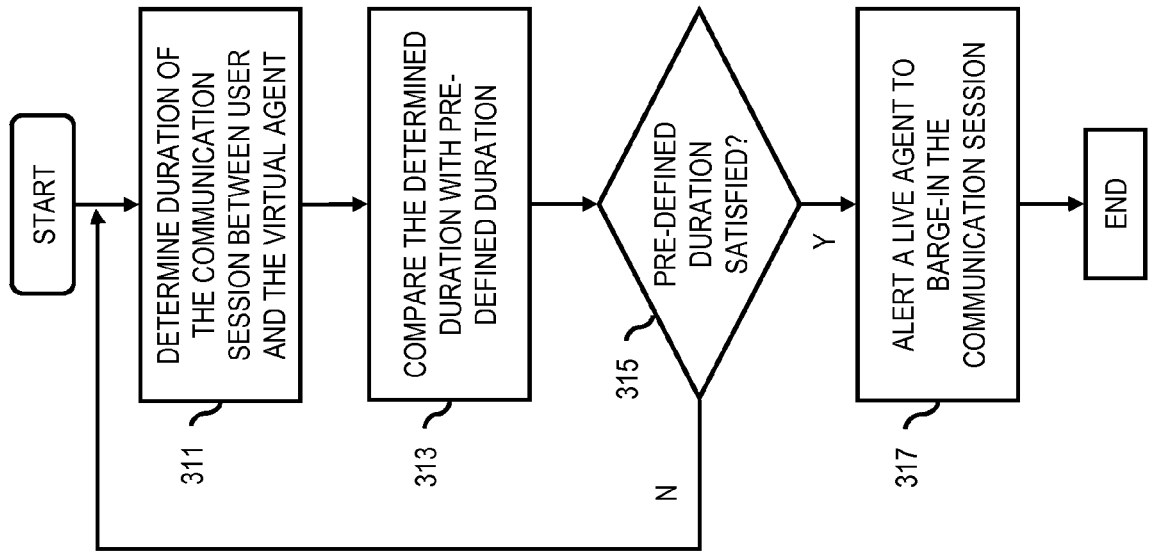
Figure 3B:
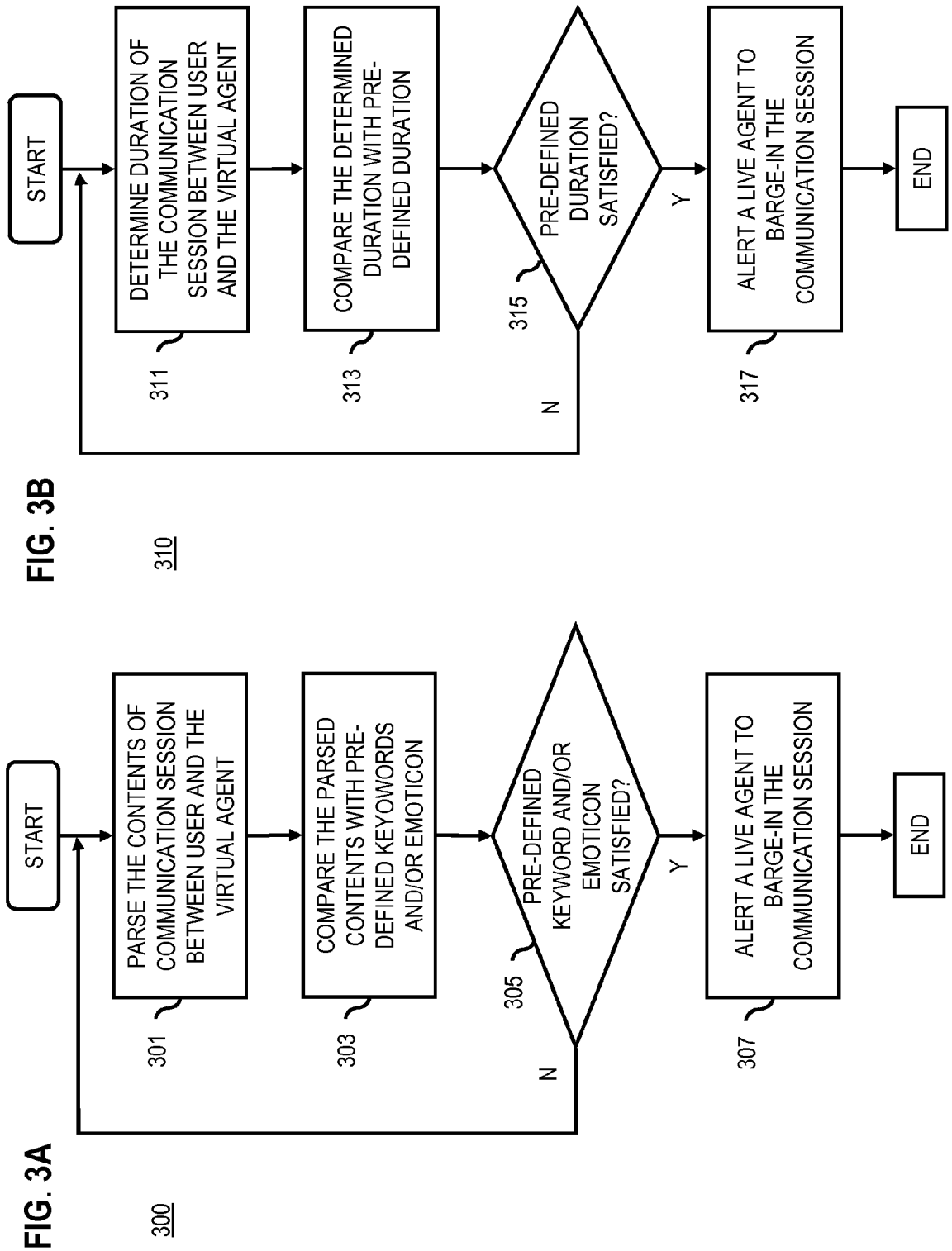
Figure 3D:
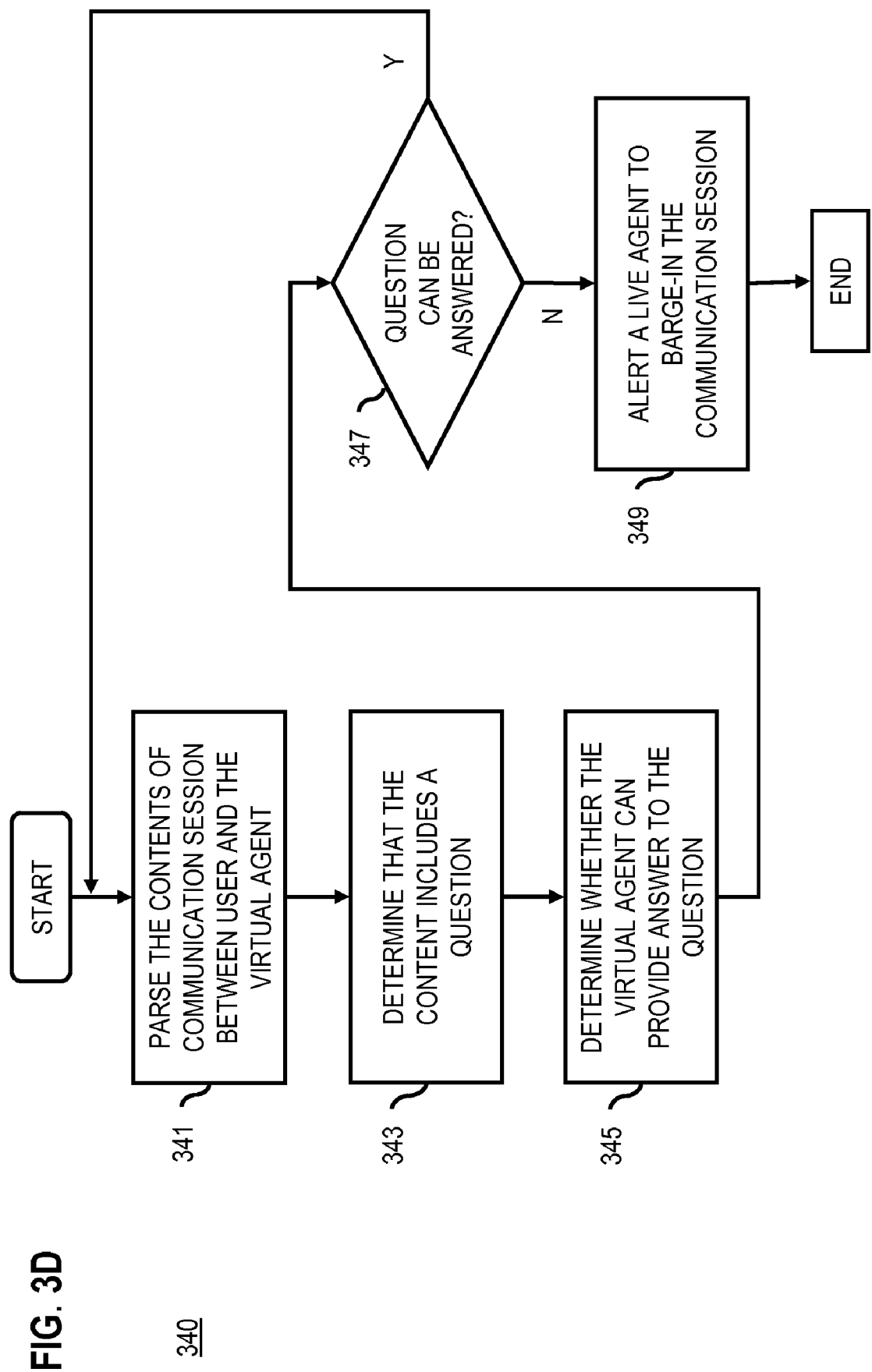

FIG. 2 is a diagram of components of a customer support system utilized in system 1A, according to an exemplary embodiment. The customer support system 101 can include a chat interface 201, a virtual chat application 203, a live chat application 205, a service assistance system 207, a user profile database 213, an administration database 215, a monitoring system 217, and a keywords/rules database 115.

The chat interface 201 can be configured to establish a chat communication session between a chat application associated with a user and at least one of virtual chat application 203 and live chat application 205. The chat communication session, as used herein, can also be referred to as instant messaging (IM) sessions or instant communication sessions. In one exemplary embodiment, the virtual chat application 203 can be associated to virtual agents (such as virtual agents 107a-107n of FIG. 1A) and the live chat application 205 can be associated to live agents 109a-109p of FIG. 1A. However, it is contemplated that customer support system 101 can utilize a single chat application to support multiple agents.

According to one exemplary embodiment, upon contact by the user, the chat interface 201 can initiate a virtual chat session between service assistance system 207 and/or a virtual agent and a chat application of the user to be used to provide a variety of customer support services. The virtual chat application 203 can gather information from the user (e.g., by posing questions to the user) to be used by the service assistance system 207. Virtual chat application 203 can communicate proposed solutions to the user, as formulated by the service assistance system 207.

The service assistance system 207 can include, in addition to other modules, a question and answer module 209 and a query execute module 211. The service assistance system 207 has access to a user profile database 213 and an administration database 215. The queries generated by the query execute module 211 to the databases 213 and 215 may be in the form of an XQuery, which is a structured query language (SQL). XQuery provides the capability to generate queries of eXtensible Mark-up Language (XML) data. Although the query execute module 211 and databases 213 and 215 are described with respect to XQuery, it is contemplated that other query languages can be utilized.

In one exemplary embodiment, the monitoring system 217 can be used to monitor the chat interference 201 and/or the virtual chat application 203 to supervise content of the communication chat session between the user and the service assistance system 207 and/or the virtual agent (such as virtual agent 107a of FIG. 1A). The monitoring system 217 can enable a live chat application 205 such that a live agent (such as live agent 109a of FIG. 1A) can intercept and/or barge-in the chat session between the user and virtual agent 107a of FIG. 1A if it is detected that costumer support provided by virtual agent 107a of FIG. 1A is below a required service level.

In one exemplary embodiment, the monitoring system 217 can includes a monitoring module 219, a rules module 221, a barge-in module 223, a communication interface 225, and an agent selection module 227. In on example, the monitoring module 219 can monitor content of the chat communication session between virtual agent 107a of FIG. 1A and the user. For example, the monitoring module 219 can parse the content of the communication session. The monitoring system 217 can have access to keywords/rules database 115 and the rules (or alert) module 221 can be configured to retrieve pre-defined keywords and/or rules from the database 115.

Further, the rules module 221 is configured to determine whether the content of the chat communication session satisfy the retrieved keywords and/or rules. If it is determined that the content of the communication session satisfy pre-defined keywords and/or rules, barge-in module 223 can selectively initiate a barge-in of the chat communication session by a live agent (such as live agent 109a of FIG. 1A). In one exemplary embodiment, the barge-in module 223 can generate an alert message to be transmitted to a live agent device (such as live agent device 111a of FIG. 1A) of live agent 109a of FIG. 1A, where the alert message can include information regarding the content of the communication (for example, part of the content of the communication that triggered the barge-in initiation). Also, according to another exemplary embodiment, the barge-in module 223 can alert the live chat application 205 to initiate a chat communication session between the user and the live agent 109a and/or to intercept and/or barge-in the virtual chat communication session of the virtual agent 107a.

Moreover, the communication interface 225 can be configured to transmit the generated alert message to an alert monitor (such as alert monitor 113 of FIG. 1A). Alert monitor 113 of FIG. 1A can present the alert messages as part of a real-time dashboard, for example. In one exemplary embodiment, the alert monitor 113 can be monitored by live agent 109a before interception and/or barge-in. In this exemplary embodiment, live agent 109a can intercept and/or barge-in the chat communication of the virtual agent 107a and the user, if live agent 109a determines, based on the alert message, that the service provided by the virtual agent 107a is not satisfactory. This exemplary embodiment introduces another level of monitoring that can be provided by customer support system 101 of FIG. 1A.

Also, the monitoring system 217 can include an optional agent selection module 227. In one exemplary embodiment, if it is determined that the content of the chat communication session satisfy the pre-defined rules and/or keywords, optional agent selection module 227 can select a live agent among a plurality of agents. This selection, according to one exemplary embodiment, can be based on the content of the communication session.

Although the exemplary embodiments of FIG. 2 are described with respect to chat applications, however, it is contemplated that any service communication channel can be used.

FIGS. 3A-3D are flowcharts of processes for monitoring contents of communication sessions based on pre-defined rules and/or keyword, according to various exemplary embodiments. In one embodiment, these processes can be performed by the customer support system 101 of FIG. 1A.

In the exemplary process 300, messages between the user and the virtual agent are checked for presence of keywords and/or emoticons. At step 301, the content of the communication session between the user and the virtual agent (e.g., virtual agent 107a of FIG. 1A) is monitored by intercepting messages between the user and virtual agent 107a. In one example, these messages can include words, characters, numbers, symbols, etc. At step 303, the intercepted messages are compared with pre-defined keyword and/or emoticons, which can be stored in keywords and/or rules database 115 of FIG. 1A.

At step 305, it is determined whether the intercepted messages satisfy the pre-defined keywords and/or emoticons. For example, the process 300 determines if one or more of the pre-defined keywords and/or emoticons exist in the content of the communication session. If the pre-defined keywords and/or emoticons are satisfied, at step 307, a barge-in of the communication session by a live agent (e.g., live agent 109a) is initiated and live agent 109a is alerted.

In one exemplary embodiment, the pre-defined keywords and/or emoticons are configurable and can be set based on service requirements of customer support system 101. In one instance, the pre-defined keywords and/or emoticons can include words associated with profanity, emoticons or textual expressions indicating frustration and/or anger of the user, etc.

In the exemplary process 310, duration of a communication session can be used to determine whether the service provided by the virtual agent 107a is satisfactory. At step 311, duration of the communication session between the user and the virtual agent 107a is determined. In one exemplary embodiment, a time stamp associated with the start of the session is compared to the current time. At step 313, the determined duration of the communication session is compared to pre-defined duration. In one example, the pre-defined duration can be stored in the keywords/rules database 115. In one exemplary embodiment, different pre-defined levels of threshold for duration of a session can be defined and an appropriate pre-defined threshold can be chosen based on, for example, the content of the communication session.

At step 315, it is determined if the pre-defined duration of the communication session is satisfied. In the case that the pre-defined duration is satisfied (for example the duration of the communication session is longer than the pre-defined duration threshold), a barge-in by the live agent 109a is initiated and the live agent 109a is alerted, per step 317.

The exemplary process 320 determines the service level of the virtual agent 107a based on number of occurrence of a keyword in content of the communication session. At step 321, the content of the communication session is monitored, for example, by intercepting the messages between the user and the virtual agent 107a. At step 323, the intercepted messages are compared with pre-defined keyword. At step 325, it is determined whether a pre-defined keyword is present in the intercepted message.

If the pre-defined keyword is present, at step 327, number of occurrences of the pre-defined keyword is determined. For example, a counter can be defined for each detected pre-defined keyword, and the value of the counter can be increased each time that particular pre-defined keyword is repeated. At step 329, the number of occurrence of the pre-defined keyword is compared to pre-defined threshold for that particular keyword and it is determined whether the threshold is satisfied (for example, whether number of occurrence of a keyword is larger than a pre-defined threshold for that keyword). It is noted that pre-defined thresholds for different keywords can be the same and/or be different and can be configurable based on service level requirements. Barge-in by the live agent 109a is initiated at step 331, if the pre-defined threshold is satisfied.

Process 340 illustrates another exemplary embodiment where existence of a question in the content of the communication session and a determination of ability of the virtual agent to provide answer can trigger initiation of the barge-in process. At step 341, content of the communication session is parsed. For example, messages between the user and the virtual agent 107a are intercepted. At step 343, a determination is made whether the intercepted message includes a question. In one example, the existence of question marks, question words, etc. is checked for detecting a question in the content of the communication session.

If a question is detected in the content, at step 345 it is determined whether virtual agent 107a can be able to provide an answer to the question. In one exemplary embodiment, this determination can be made by examining a predetermined set of answers. The predetermined set of answers, in one example, is accessible by the virtual agent 107a and if an answer to the detected question does not belong to the predetermined set, it can be concluded that the virtual agent 107a is unable to provide an answer. In this example, the inability of the virtual agent 107a to provide an answer is checked at step 347 and the barge-in process is initiated at step 349.

Although exemplary processes 300, 310, 320, and 340 are provided, it is contemplated that any combination of these processes and/or other processes can be used to determine level of service provided by the virtual agent 107a. As another example, response time of the virtual agent 107a, number of searches and/or queries performed by the virtual agent 107a, etc. can be used as pre-defined rules.

Figure 4:
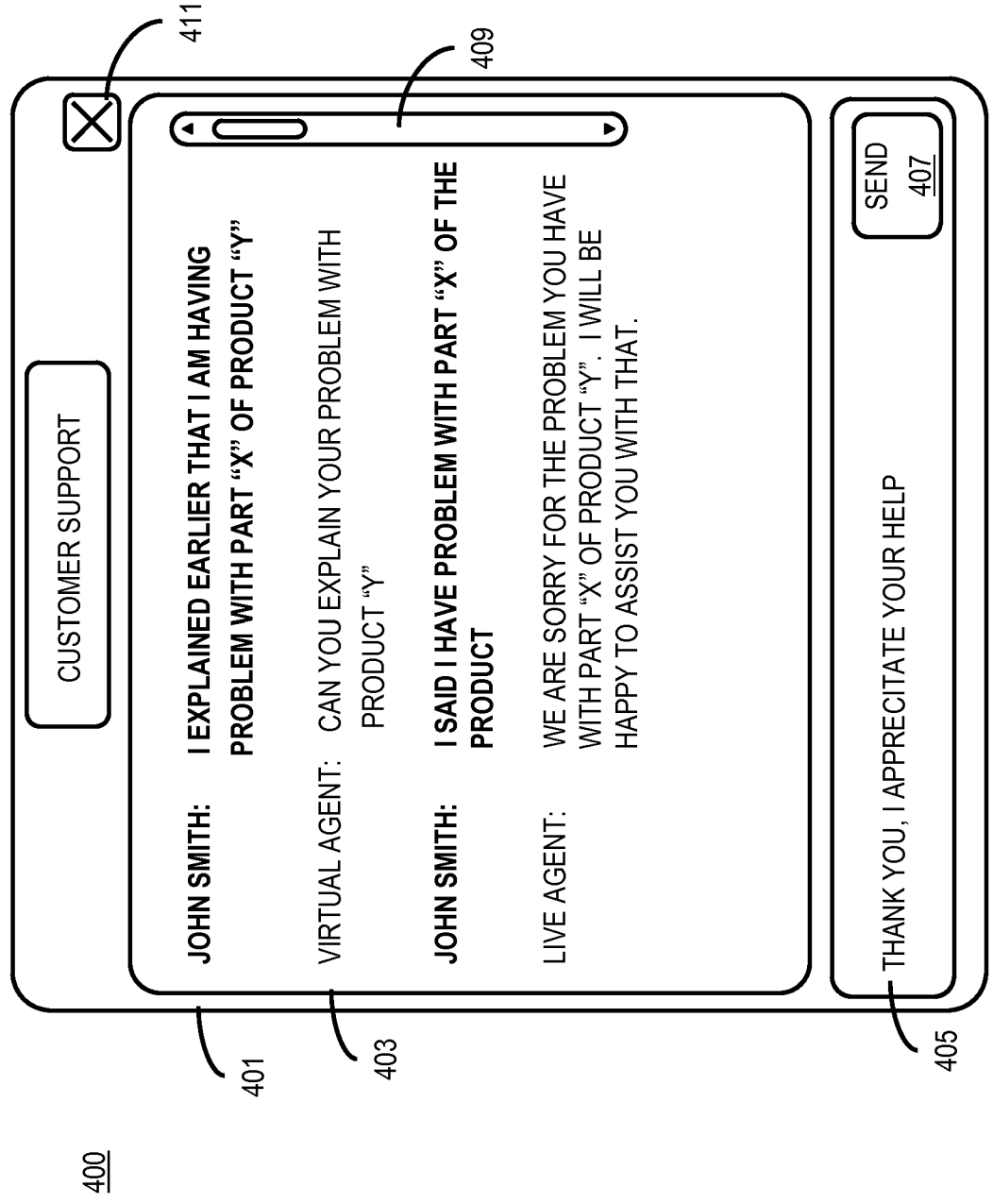
FIG. 4 is a diagram of a graphical user interface (GUI) for providing a chat-based interface, according to an exemplary embodiment.

FIG. 4 is a diagram of a graphical user interface (GUI) for providing chat-based interface, according to one exemplary embodiment. The graphical user interface 400 provides an instant communication such as chat-based interface 401 for communication between a customer or user and a customer support system (e.g., the customer support system 101 of FIG. 1A). In this exemplary embodiment, the graphical user interface 400 presents a text dialog box 403 that represents conversation between the user the customer support system 101 of FIG. 1A. The text dialog 403 initially presents text exchanged between the user ("John Smith") and a virtual agent (e.g., virtual agent 107a of FIG. 1A).

According to an exemplary embodiment, the text dialog 403 provided by a live agent (such as live agent 109a of FIG. 1A) after an intervention (or barge-in) condition is identified. In this exemplary embodiment, the virtual chat application 203 and the live chat application 205 of FIG. 2, use the same graphical user interface 400 to communicate with the user. Live agent 109a of FIG. 1A can intercept and/or barge-in the chat communication session, in the graphical user interface 400, when it is detected that customer support level is below a required level. In another exemplary embodiment (not shown) a new chat based interface can be initiated for live agent 109a of FIG. 1A.

The graphical user interface 400 can include an input box or region 405 that can be used by the user to provide text. The user can use send button 407 to transmit the text to the customer support system 101 of FIG. 1A. The graphical user interface 400, according to some embodiments, may also include one or more navigation elements (e.g., scroll bar 409) for reviewing previous messages associated with the chat communication session, as well as one or more user interface components for terminating the instant communication session, such as button 411.

Figure 5:
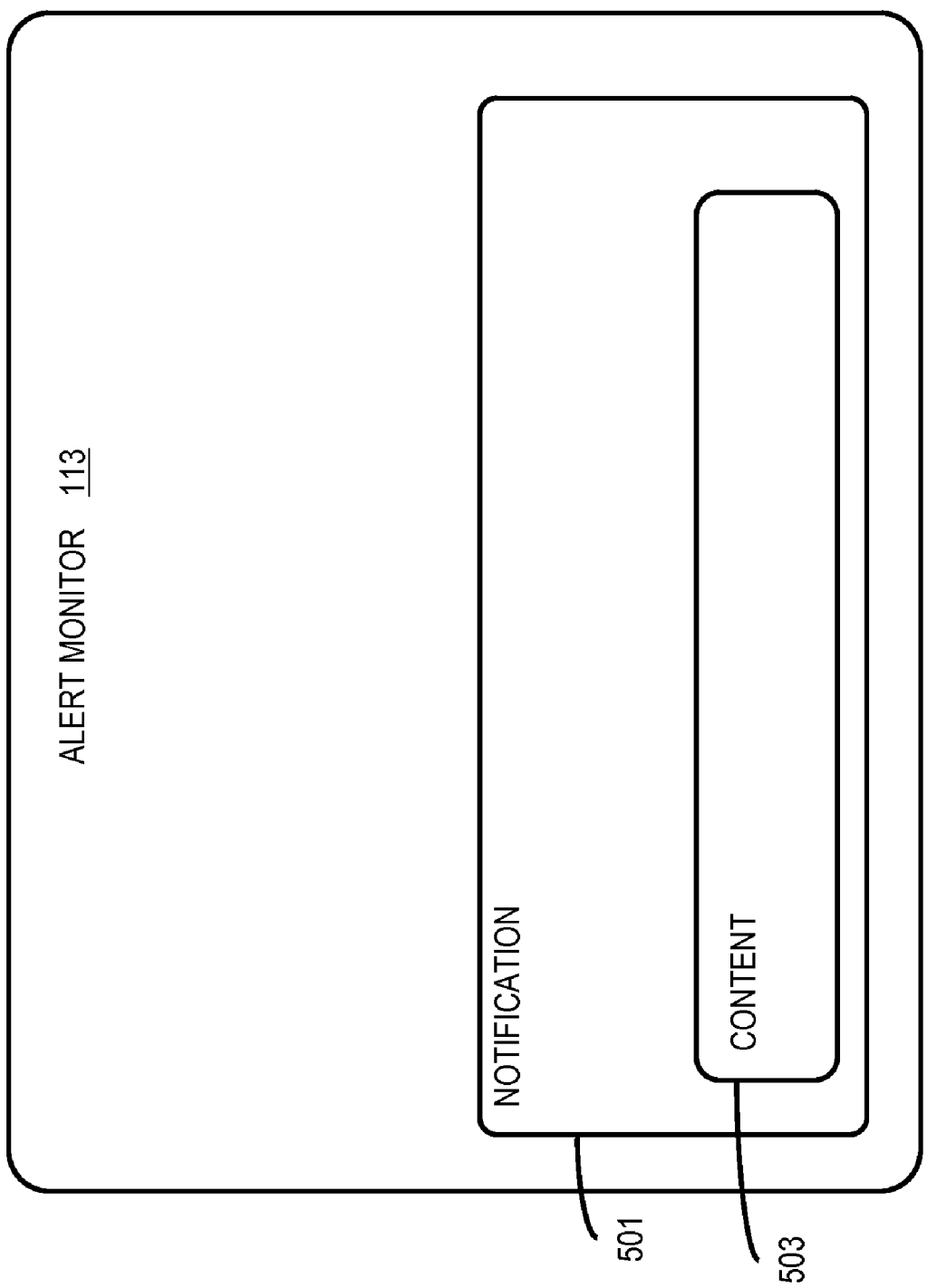
FIG. 5 is a diagram of an alert monitor configured to present information regarding communication session with a virtual agent, according to an exemplary embodiment.

FIG. 5 is a diagram of an alert monitor configured to present information regarding communication session with a virtual agent, according to an exemplary embodiment. The alert monitor 113, which in one exemplary embodiment, can be coupled to a live agent device (such as live agent device 111a) can be configured to present alert messages provided by the customer support system 101 and/or information associated with a content of a communication session for which the alert message was generated. In the exemplary embodiment of FIG. 5, the alert monitor 113 can include a notification dashboard 501 configured to present contents in content box 503.

In one exemplary embodiment, the content box 503 can present contents of communication sessions that have satisfied pre-defined keywords and/or rules. Further, the content box 503 can present information regarding the user and the virtual agent that are engaged in the communication session and information regarding reasons for alert message (for example, pre-defined rules and/or keywords that are satisfied). Alternatively or additionally, the content box 503 can present a preferred or selected live agent for alert messages. According to one exemplary embodiment, the content box 503 can show terminal and or live agent devices at which the barge-in process is initiated. According to another exemplary embodiment, live agents 109a-109p can monitor the alert monitor 113 and the contents and determine if live agents' intervention is necessary, which can introduce another level of monitoring.

The described implementations and processes, according to certain embodiments, advantageously provide a platform to offer economical and effective customer assistance by flexibly and efficiently merging customer support provided by virtual agent tools and human-assisted customer support tools.

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 6 illustrates computing hardware (e.g., computer system) upon which an embodiment according to the invention can be implemented. The computer system 600 includes a bus 601 or other communication mechanism for communicating information and a processor 603 coupled to the bus 601 for processing information. The computer system 600 also includes main memory 605, such as random access memory (RAM) or other dynamic storage device, coupled to the bus 601 for storing information and instructions to be executed by the processor 603. Main memory 605 also can be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   monitoring content of a communication session between a virtual agent and a user;
   determining with a processor whether the content satisfies a pre-defined rule; and
   selectively initiating a barge-in of the communication session by a live agent based on the determination.

2. A method of claim 1, further comprising:
   generating an alert message if the pre-defined rule is satisfied; and
   transmitting the alert message to an alert monitor configured to present information about the communication session to the live agent.

3. A method of claim 1, wherein the communication session is a chat session, and the pre-defined rule specifies presence of a keyword, number of occurrence of the keyword, duration of the communication session, an emoticon, or a combination thereof.

4. A method of claim 3, wherein the pre-defined rule is based on a service level requirement.

5. A method of claim 1, further comprising:
   detecting that the content includes a question to the virtual agent; and
   determining whether the virtual agent can provide an answer to the question from a predetermined set of answers, wherein the pre-defined rule specifies an inability to provide an answer to the question.

6. A method of claim 1, further comprising:
   determining the live agent from a plurality of live agents based on the content of the communication session.

7. An apparatus comprising:
   a processor configured to monitor content of a communication session between a virtual agent and a user, to determine whether the content satisfies a pre-defined rule, and to selectively initiate a barge-in of the communication session by a live agent based on the determination.

8. An apparatus of claim 7, wherein the processor is further configured to generate an alert message if the pre-defined rule is satisfied, the apparatus further comprising:
   a communication interface configured to transmit the alert message to an alert monitor configured to present information about the communication session to the live agent.

9. An apparatus of claim 7, wherein the communication session is a chat session, and the pre-defined rule specifies presence of a keyword, number of occurrence of the keyword, duration of the communication session, an emoticon, or a combination thereof.

10. An apparatus of claim 9, wherein the pre-defined rule is based on a service level requirement.

11. An apparatus of claim 7, wherein the processor is further configured to detect that the content includes a question to the virtual agent, and to determine whether the virtual agent can provide an answer to the question from a predetermined set of answers, wherein the pre-defined rule specifies an inability to provide an answer to the question.

12. An apparatus of claim 7, wherein the processor is further configured to determine the live agent from a plurality of live agents based on the content of the communication session.

13. A system comprising:
   a chat interface configured to establish a chat communication session between a virtual agent and a chat application associated with a user;

a monitoring module configured to monitor content of the communication session;

a rules module configured to retrieve a pre-defined rule to determine whether the content satisfies the pre-defined rule; and a barge-in module configured to selectively initiate a barge-in of the communication session by a live agent based on the determination.

14. A system of claim 13, further comprising:

an alert monitor configured to present an alert message to the live agent if the pre-defined rule is satisfied.

15. A system of claim 14, wherein the alert message is presented as part of a real-time dashboard.

16. A system of claim 13, wherein the pre-defined rule specifies presence of a keyword, number of occurrence of the keyword, duration of the chat communication session, an emoticon, or a combination thereof.

17. A system of claim 16, wherein the pre-defined rule is based on a service level requirement.

18. A system of claim 13, wherein monitoring module is further configured to detect that the content includes a question to the virtual agent, and to determine whether the virtual agent can provide an answer to the question from a predetermined set of answers, the predefined rule specifying an inability to provide an answer to the question.

19. A system of claim 13, further comprising:

an agent selection module configured to determine the live agent from a plurality of live agents based on the content of the communication session.

20. A system of claim 13, wherein the system is maintained by a service provider, and the chat communication session relates to a service of the service provider.

* * * * *